(12) United States Patent
Kinnan et al.

(10) Patent No.: US 12,370,785 B2
(45) Date of Patent: *Jul. 29, 2025

(54) MULTILAYER FILM

(71) Applicant: Berry Global, Inc., Evansville, IN (US)

(72) Inventors: Michael A. Kinnan, North Canton, OH (US); Bryan S. Gillespie, Altoona, WI (US); Brooke D. Kitzmiller, North Canton, OH (US)

(73) Assignee: Berry Global, Inc., Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,717

(22) Filed: Nov. 3, 2023

(65) Prior Publication Data

US 2024/0059054 A1 Feb. 22, 2024

Related U.S. Application Data

(63) Continuation of application No. 17/519,044, filed on Nov. 4, 2021, now Pat. No. 11,845,242.
(Continued)

(51) Int. Cl.
*B32B 27/08* (2006.01)
*B29C 48/00* (2019.01)
(Continued)

(52) U.S. Cl.
CPC ............ *B32B 27/08* (2013.01); *B29C 48/022* (2019.02); *B29C 48/08* (2019.02); *B29C 48/21* (2019.02); *B32B 3/08* (2013.01); *B32B 3/18* (2013.01); *B32B 27/32* (2013.01); *B29K 2023/0616* (2013.01); *B29K 2023/0625* (2013.01); *B29K 2023/12* (2013.01); *B29K 2995/0098* (2013.01); *B32B 2307/5825* (2013.01); *B32B 2307/748* (2013.01); *Y10T 428/24* (2015.01)

(58) Field of Classification Search
CPC ....... B29C 48/022; B29C 48/08; B29C 48/19; B29C 48/21; B29K 2023/0616; B29K 2023/0625; B29K 2023/12; B29K 2995/0098; B29L 2007/008; B29L 2009/00; B32B 2250/242; B32B 2270/00; B32B 2307/581; B32B 2307/5825; B32B 2307/748; B32B 2553/00; B32B 27/08; B32B 27/32; B32B 27/327; B32B 3/08; B32B 3/18; B32B 7/06; Y10T 428/24
See application file for complete search history.

(56) References Cited

U.S. PATENT DOCUMENTS

| | | |
|---|---|---|
| 2001/0011779 A1 | 8/2001 | Stover |
| 2006/0108062 A1 | 5/2006 | Smith et al. |

(Continued)

FOREIGN PATENT DOCUMENTS

| | | |
|---|---|---|
| CN | 1217779 C | 9/2005 |
| WO | 2001049487 A1 | 7/2001 |

OTHER PUBLICATIONS

Partial Supplementary European Search Report for EP21890062.9 dated Sep. 12, 2024, BP-559 EP ∥ 14 pages.
(Continued)

*Primary Examiner* — Lawrence D Ferguson
(74) *Attorney, Agent, or Firm* — Barnes & Thornburg LLP (57) ABSTRACT

A multilayer film includes a first skin layer, a second skin layer, and a core layer. The core layer includes at least two lanes of material. Each of the lanes of material of the core layer contacts each of the first skin layer and the second skin layer.

20 Claims, 4 Drawing Sheets

Related U.S. Application Data (60) Provisional application No. 63/110,129, filed on Nov. 5, 2020.

(51) Int. Cl.
  *B29C 48/08* (2019.01)
  *B29C 48/21* (2019.01)
  *B32B 3/08* (2006.01)
  *B32B 3/18* (2006.01)
  *B32B 27/32* (2006.01)
  *B29K 23/00* (2006.01)

(56) References Cited

U.S. PATENT DOCUMENTS

| | | |
|---|---|---|
| 2010/0208165 A1 | 8/2010 | Kamada |
| 2011/0176325 A1 | 7/2011 | Sherman |
| 2016/0011157 A1 | 1/2016 | Smyth et al. |
| 2019/0137463 A1 | 5/2019 | Smyth et al. |

OTHER PUBLICATIONS

Berry Global, "Bakery Sell Sheet", at least available before Nov. 5, 2020, 2 pages.
Berry Plastics, "FreshView Bakery Bags From Berry Plastics Brochure", at least available before Nov. 5, 2020, 2 pages.
International (PCT) search report and written opinion for PCT/US21/58058 dated Mar. 18, 2022, BP-559 PCT II, 11 pages.
Millipore, "PureFlex(TM) Single-Use Process Container Films" 1, 2. Merck. Web 2017, p. 1, first paragraph and last paragraph.
Mirams, "The Evolution of Mettalocene LLDPE Resins" 1-3, White Paper. Web. May 2019; p. 1, first paragraph, p. 2, and Fig. 3.
Office Action (Non-Final Rejection) dated Apr. 11, 2023 for U.S. Appl. No. 17/519,044 (pp. 1-8).

FIG. 6

MULTILAYER FILM

PRIORITY CLAIM

This application is a continuation of U.S. application Ser. No. 17/519,044, filed Nov. 4, 2021, which claims priority under 35 U.S.C. § 119(e) to U.S. Provisional Application No. 63/110,129, filed Nov. 5, 2020, each of which is expressly incorporated by reference herein.

BACKGROUND

The present disclosure relates to films, and particularly to multilayer films. More particularly, the present disclosure relates to multilayer films for wrapping products.

SUMMARY

According to the present disclosure, a load includes a product and a multilayer film wrapped around the product. The multilayer film includes a first skin layer, a second skin layer, and a core layer extending between and interconnecting the first skin layer and the second skin layer along a vertical axis.

In some embodiments, the core layer includes a first lane and a second lane located adjacent the first lane along a longitudinal axis. In some embodiments, the core layer includes a third lane to locate the second lane between the first lane and the third lane along the longitudinal axis. Illustratively, the first lane comprises a composition and the second lane comprises a composition different than the composition of the first lane.

In some embodiments, the core layer has a thickness measured along the vertical axis. In illustrative embodiments, the first lane and the second lane of the core layer extend the height of the core layer along the vertical axis.

In illustrative embodiments, each layer of the multilayer film is extruded. In some illustrative embodiments, each of the first skin layer, the second skin layer, and the core layer are co-extruded together to form the multilayer film.

Additional features of the present disclosure will become apparent to those skilled in the art upon consideration of illustrative embodiments exemplifying the best mode of carrying out the disclosure as presently perceived.

DETAILED DESCRIPTION

Figure 1:
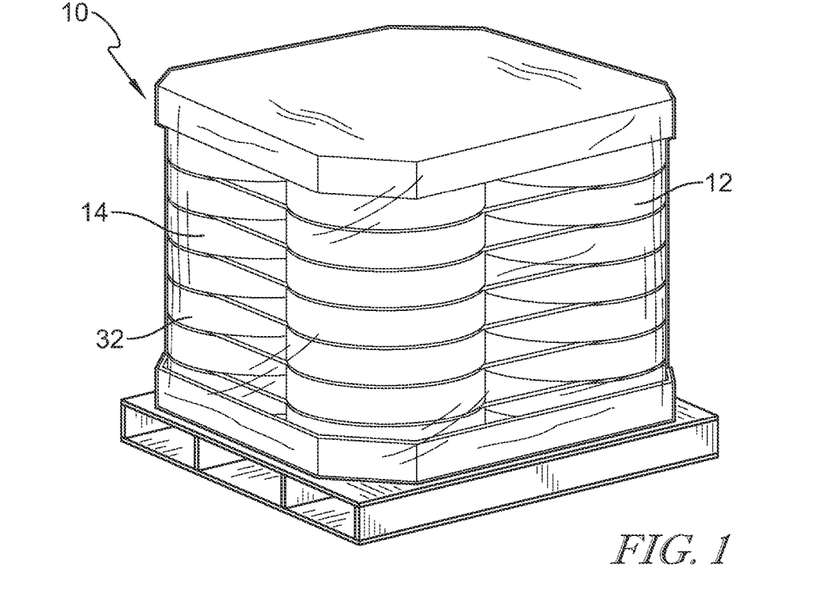
FIG. 1 is a perspective view of a load including a product and a multilayer film wrapped around the product.
Figure 2:
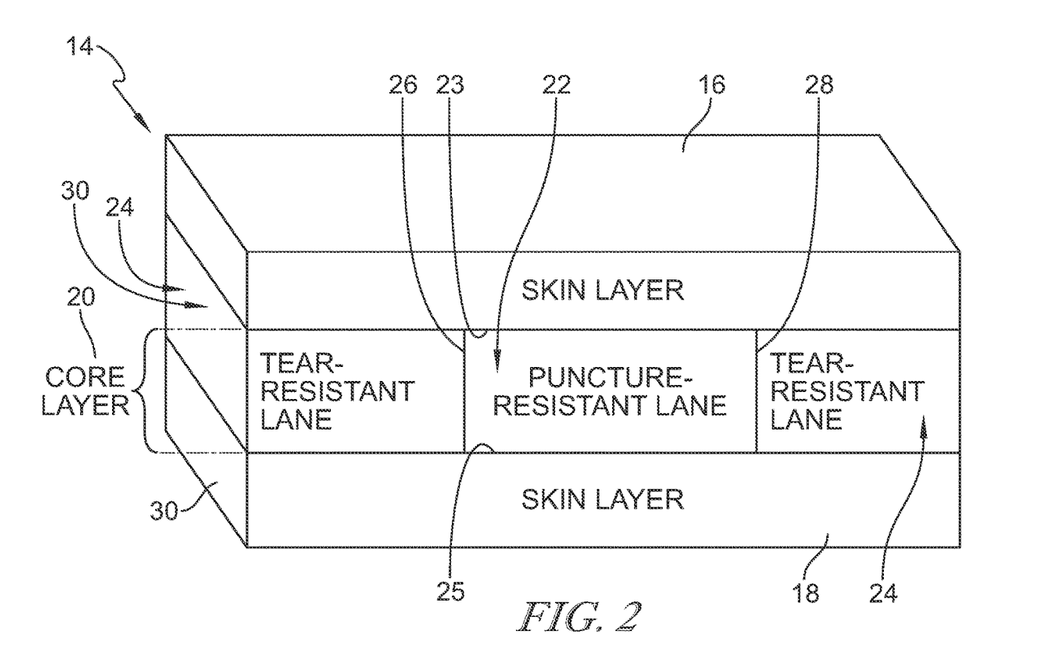
FIG. 2 is an illustration of the multilayer film of FIG. 1 showing, from top to bottom, a skin layer, a core layer, and a skin layer, and further showing the core layer contains a puncture-resistant lane located between a pair of tear-resistant lanes.
Figure 3:
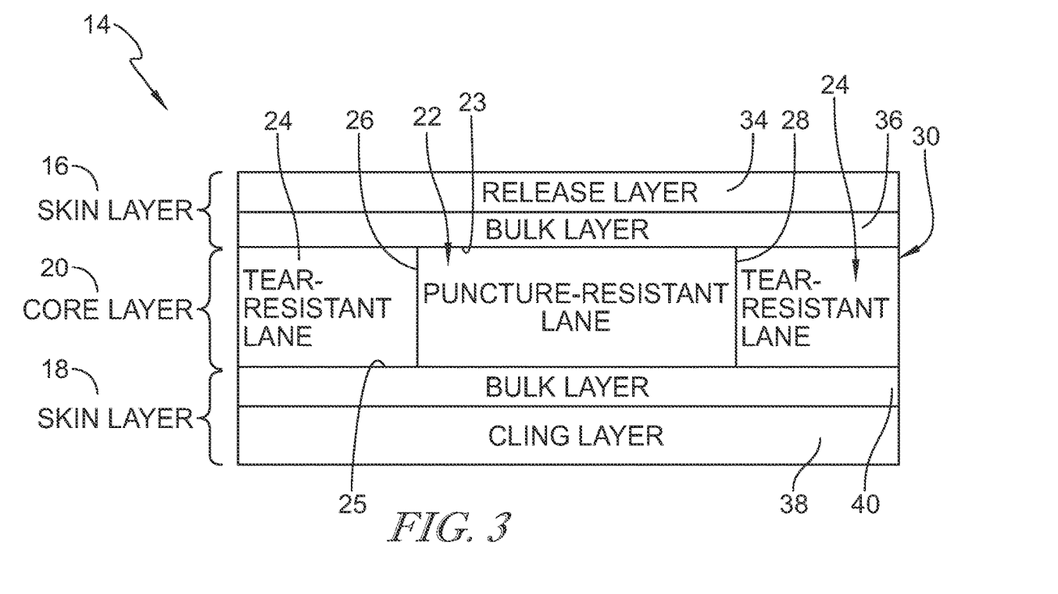
FIG. 3 is an illustration of a multilayer film similar to the multilayer film of FIG. 2, showing the skin layer from top to bottom includes a release layer and a bulk layer located between the release layer and the core layer, and further showing a skin layer includes a cling layer and a bulk layer located between the cling layer and the core layer.
Figure 5:
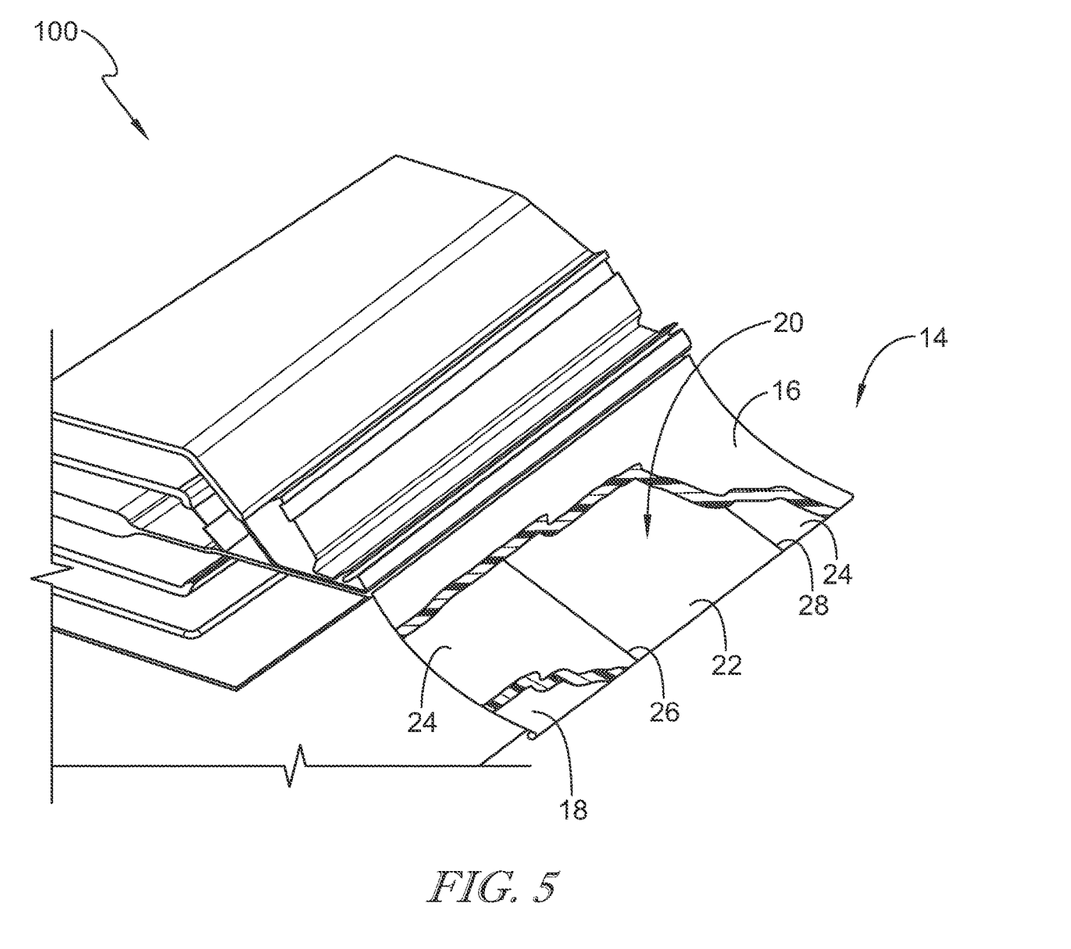
FIG. 5 is an illustration of a process of forming a multilayer film, with a portion of top skin layer broken away to show the underlying core layer having from left to right a first lane and a second lane that meet at an interface, and further showing a portion of the core layer broken away to show a second skin layer.
Figure 6:
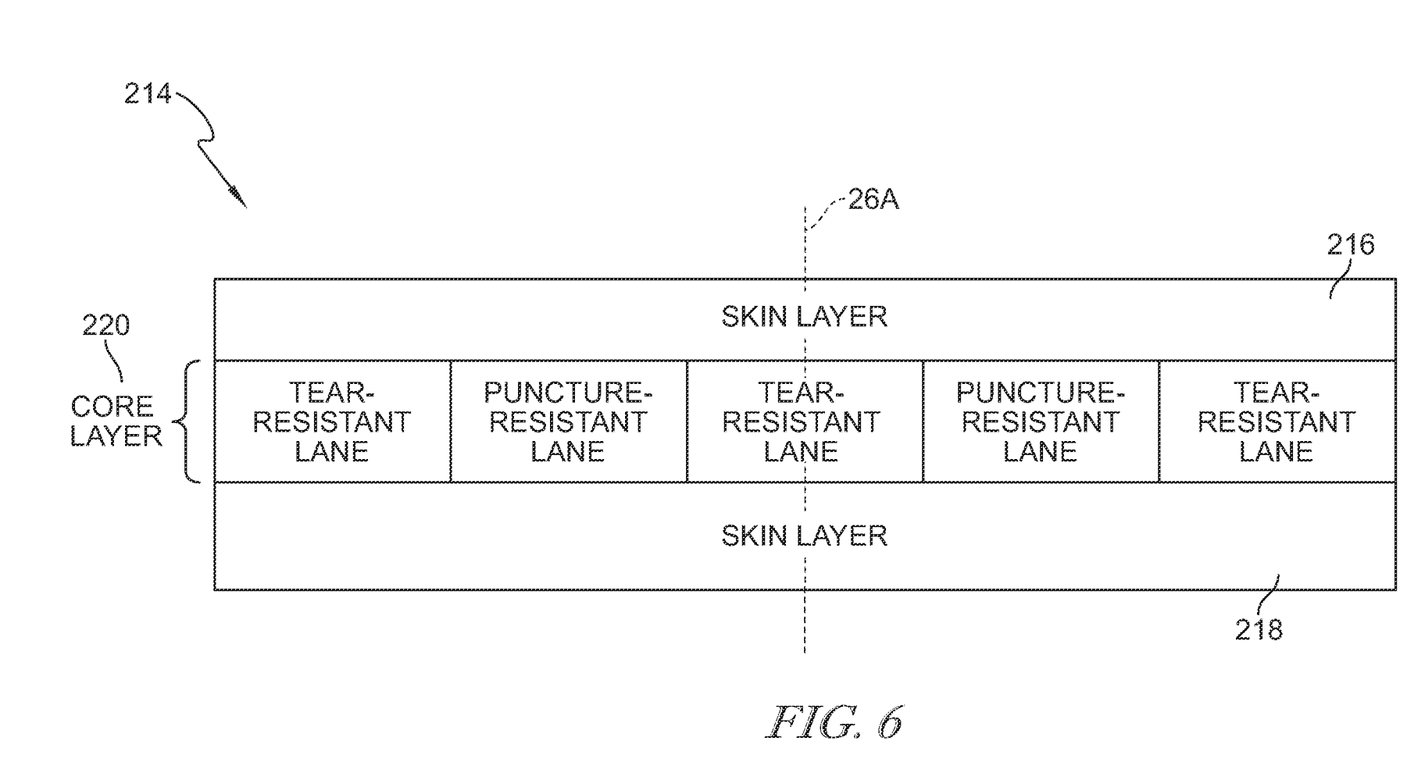
FIG. 6 is an embodiment of a multilayer film directly from an extrusion process, where the multilayer film may be cut to form a multilayer film of FIG. 2 or FIG. 3.

Load 10, as shown in FIG. 1, includes a product 12 and a film 14 wrapped around product 12. Film 14 secures product 12 during transportation of load 10. Transporting loads 10 can expose load 10 to harsh conditions that may allow for multilayer film 14 to be punctured either by product 12 or from external objects. Punctures in a film could then propagate across the width of the film and unsecure product 12. Materials that provide good stretch and puncture resistance properties for a film typically provide poor tear-propagation resistance. Conversely, materials that provide tear-propagation resistance typically provide poor stretch and poor puncture resistance. Poor tear-propagation resistance can lead to failure when a tear is formed in the film and the tear then propagates to the edge of the film. Thus, films, such as multilayer film 14, including tear-resistance features and puncture-resistance features in the film may decrease failures for load 10. Multilayer film 14 described herein comprises a core layer 20 including a tear-resistant lane 24 and a puncture-resistant lane 22 located adjacent the tear-resistant lane 24, as shown in FIGS. 2, 3, and 5. Tear-resistant lane 24 and puncture-resistant lane 22 may cooperate to provide stretch, puncture resistance, and tear resistance properties to multilayer film 14. Another embodiment, of multilayer film 214 is shown in FIG. 6.

Multilayer film 14 includes a skin layer 16, a skin layer 18, and core layer 20, as shown in FIG. 2. When used to wrap around product 12, skin layer 16 forms an outer surface 32 of load 10. When used to wrap around product 12, skin layer 18 is arranged to face product 12. Core layer 20 extends between and interconnects skin layer 16 and skin layer 18. Skin layer 16, skin layer 18, and core layer 20 cooperate to provide tear resistance, puncture resistance, and stretch to multilayer film 14.

In illustrative embodiments, skin layer 16, skin layer 18, and core layer 20 are coextruded, as shown in FIG. 5. Coextruding skin layer 16, skin layer 18, and core layer 20 together allows extrusion interfaces to form between each of the layers. For example, as a result of the coextrusion process, an extrusion interface 23 exists between skin layer 16 and core layer 20. As another example, an extrusion interface 25 exists between skin layer 18 and core layer 20. Extrusion interfaces are distinct from lamination interfaces in that material from each of the adjoining layers at an extrusion interface may blend between the layers during the coextrusion process. In some embodiments, an adhesive is not present at each of the extrusion interfaces.

In illustrative embodiments, multilayer film 14 is less than about 2 mils or less than about 1 mil thick. In some embodiments, multilayer film 14 is about 0.2 mils to about 2 mils, about 0.2 mils to about 1.5 mils, or about 0.2 mils to about 1 mil thick.

Figure 4:
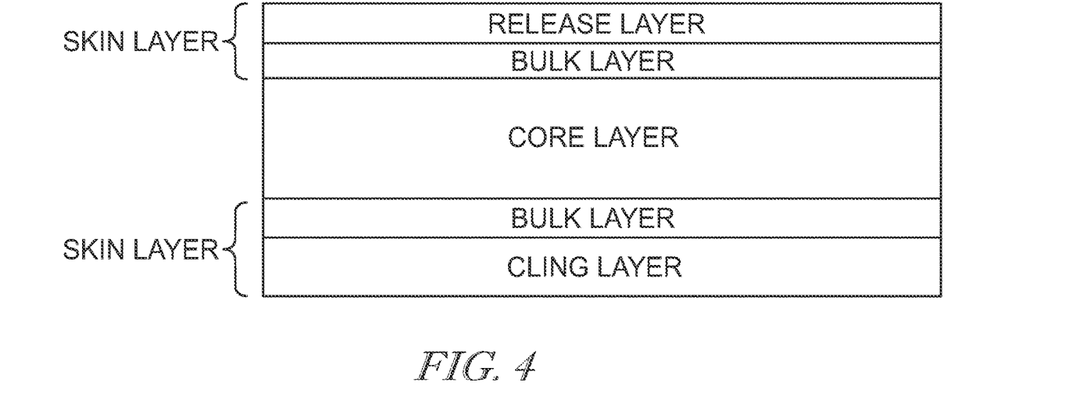
FIG. 4 shows a prior art film where the core layer is a continuous layer from left to right between the two skin layers.

Core layer 20 is located between skin layers 16, 18, and includes a first lane and a second lane, as shown in FIGS. 2, 3, and 5. Illustratively the first lane may be puncture-resistant lane 22 and the second lane may be tear-resistant lane 24 located adjacent puncture-resistant lane 22, as shown in FIGS. 2, 3, and 5. In illustrative embodiments, core layer 20 includes a second tear-resistant lane 24 to locate puncture-resistant lane 22 between the two tear-resistant lanes 24. Illustratively, if a tear forms in puncture-resistant lane 22 and propagates trans-directionally toward tear-resistant lane 24, tear-resistant lane 24 may retard the propagation of the trans-direction tear through tear-resistant lane 24. In contrast, the prior art film shown in FIG. 4 does not include more than one lane in the core layer and may therefore have less resistance to tear propagation.

Along a vertical axis, core layer 20 is about at least about 20% of the thickness of multilayer film 14. In some embodiments, core layer 20 is about 20% to about 80%, about 30% to about 80%, about 40% to about 80%, about 40% to about 75%, or about 50% to about 75% of the thickness of multilayer film 14. In some embodiments, core layer 20 is about 25% to about 45% of the thickness of the multilayer film.

Puncture-resistant lane 22 and tear-resistant lane 24 may be coextruded together with the other layers of multilayer film 14. In illustrative embodiments, the extrusion is a cast-film coextrusion. Extrusion interfaces 26 and 28 form as a result of the coextrusion process, as shown in FIGS. 2 and 3. Illustratively, each of extrusion interfaces 26, 28 may include material from puncture-resistant lane 22 and material from tear-resistant lane 24. In some embodiments, material from puncture-resistant lane 22 may gradiently blend from puncture-resistant lane 22 toward the tear-resistant lane 24 at extrusion interface 26. In some embodiments, an adhesive is not present at each of the extrusion interfaces. In some embodiments, the extrusion interfaces 26, 28 are continuous along the longitudinal and vertical axis such that an air gaps do not exist at the interface. In some embodiments, the bond strength between puncture-resistant lane 22 and tear-resistant lane 24 at interfaces 26, 28 is such that the film fails at an area other than extrusion interface 26, 28 when a force is applied to separate the layers 22, 24 from each other.

Tear-resistant lane 24 extends horizontally from outer edge 30 of multilayer film 14 to puncture-resistant lane 22, as shown in FIGS. 2 and 3, and extends along a puncture-resistant lane 22 along a longitudinal axis, as suggested in FIG. 2. Tear-resistant lane 24 extends vertically between and interconnects skin layers 16, 18.

Tear-resistant lane 24 may be at least about 0.25 inches and up to about 7 inches wide along the horizontal axis. In a first set of ranges, tear-resistant lane 24 is about 0.25 inches to about 1.5 inches, about 0.25 inches to about 1.25 inches, or about 0.25 inches to about 1 inch wide. In a second set of ranges, tear-resistant lane 24 may be about 1 inch to about 7 inches, about 1 inch to about 6 inches, about 2 inches to about 6 inches, about 3 inches to about 6 inches, or about 3 inches to about 5 inches wide.

Tear-resistant lane 24 comprises a material that may impart tear-resistance to multilayer film 14. In some embodiments, tear-resistant lane 24 comprises a polypropylene, an elastomeric nylon, a polyurethane, HDPE, MDPE, or ultra high molecular weight polyethylene. In some embodiments, the polypropylene is a specialty polypropylene.

Puncture-resistant lane 22 extends horizontally from tear-resistant lane 24, as shown in FIGS. 2 and 3, and extends along a tear-resistant lane 24 along a longitudinal axis, as suggested in FIG. 2. In embodiments where multilayer film 14 includes two tear-resistance lanes, puncture-resistant lane 22 extends horizontally between and interconnects the two tear-resistant lanes 24. Puncture-resistant lane 22 extends vertically between and interconnects skin layers 16, 18.

Puncture-resistant lane 22 may be about 4 inches to about 30 inches or about 5 to about 25 inches wide along the horizontal axis. In some embodiments, puncture-resistant lane 22 is about 12 inches wide.

Puncture-resistant lane 22 comprises a material that may stretch and provide puncture resistance to multilayer film 14. In some embodiments, puncture-resistant lane 22 comprises a polyethylene. In some embodiments, the polyethylene is mLLDPE.

Skin layers 16, 18 cooperate to locate core layer 20 therebetween, as shown in FIGS. 2 and 3. In illustrative embodiments, skin layer 16 may function as or include a release layer 34. In illustrative embodiments, skin layer 18 may function as or include a cling layer 38. Skin layers 16, 18 cooperate with core layer 20 to secure multilayer film 14 to product 12 to form loads 10.

When wrapped around product 12, skin layer 16 forms an outer surface 32 of load 10. In some embodiments, skin layer 16 includes a release layer 34 and optionally a bulk layer 36. When present, bulk layer 36 is located between release layer 34 and core layer 20 along a vertical axis. If bulk layer 36 is absent, release layer 34 directly contacts core layer 20.

Release layer 34 comprises material to provide a sufficient release to a neighboring layer of film when multilayer film 14 is in a roll. Release layer 34 is at least about 5% or at least about 10% of the thickness of multilayer film 14. In some embodiments, release layer 34 is about 5% to about 30% or about 5% to about 25% of the thickness of multilayer film 14. In some embodiments, release layer 34 is about 10% of the total thickness of multilayer film 14. In some embodiments, release layer 34 comprises a polyethylene. In some embodiments, release layer 34 comprises mLLDPE.

Bulk layer 36, when present, is located between cling layer 38 and core layer 20. When present, bulk layer 36 is at least about 5% of the thickness of multilayer film 14. In some embodiments, bulk layer 36 is about 5% to about 30% or about 5% to about 25% of the thickness of multilayer film 14. In some embodiments, bulk layer 36 is about 10% of the total thickness of multilayer film 14.

Bulk layer 36 comprises a polyolefin such as polyethylene. In some embodiments, the polyethylene is a metallocene LLDPE (mLLDPE), a Ziegler-Natta LLDPE, LDPE, or a blend thereof. In some embodiments, bulk layer 36 comprises a blend of polyethylenes. In some embodiments, bulk layer 36 comprises about 5% LDPE and about 95% metallocene LLDPE such as 5230G available from The Dow Chemical Company.

When wrapped around product 12, skin layer 18 is arranged to face product 12. In some embodiments, skin layer 18 includes a cling layer 38 and optionally a bulk layer 40. When present, bulk layer 40 is located between cling layer 38 and core layer 20 along a vertical axis. If bulk layer 40 is absent, cling layer 38 directly contacts core layer 20.

Cling layer 38 comprises material to provide a sufficient tack to release layer 34 of multilayer film 14. Cling layer 38 is at least about 5% of the thickness of multilayer film 14. In some embodiments, cling layer 38 is about 5% to about 20% or about 5% to about 15% of the thickness of multilayer film 14. In some embodiments, cling layer 38 is about 10% of the total thickness of multilayer film 14. In some embodiments, cling layer 38 comprises a polyethylene. In some embodiments, cling layer 38 comprises mLLDPE or ULDPE.

Bulk layer 40, when present, is located between cling layer 38 and core layer 20. When present, bulk layer 40 is at least about 5% of the thickness of multilayer film 14. In some embodiments, bulk layer 40 is about 5% to about 30% or about 5% to about 25% of the thickness of multilayer film 14.

Bulk layer 40 comprises a polyolefin such as polyethylene. In some embodiments, the polyethylene is a metallocene LLDPE (mLLDPE), a Ziegler-Natta LLDPE, LDPE, or a blend thereof. In some embodiments, bulk layer 40 comprises a blend of polyethylenes. In some embodiments, bulk layer 40 comprises about 5% LDPE and about 95% metallocene LLDPE such as 5230G available from The Dow Chemical Company.

Multilayer film 14 can be made according to a process 100, as shown in FIG. 5. In illustrative embodiments, process 100 forms a multilayer film 214, as shown in FIG. 6, that is slit 26A along tear-resistant lane to form multilayer films 14.

Process 100 is a coextrusion process, where each of skin layers 16, 18 and core layer 20 are coextruded together. By coextruding together each layer, an extrusion interface forms between each layer and/or lane where the layers and/or lanes contact one another.

Process 100 also coextrudes together puncture-resistant lane 22 and tear-resistant lane 24. Coextruding together puncture-resistant lane 22 and tear-resistant lane 24 forms an extrusion interface 26, 28 at the junction between these two lanes, as shown in FIG. 2. The prior art film shown in FIG. 4 does not contain coextruded lanes in the core layer.

In another embodiment, a multilayer film includes two skin layers and a core layer located therebetween. The core layer may include a first lane comprising a first composition and a second lane comprising a second composition that is different from the first composition. The first composition may comprise material, such as an elastomeric nylon, that provides a constricting property to the multilayer film. The second composition may comprise material that provides a puncture-resistant property to the multilayer film.

In another embodiment, a multilayer film includes two skin layers and a core layer located therebetween. The core layer may include a first lane comprising a first composition and a second lane comprising a second composition that is different from the first composition. The first composition may comprise material that provides a tear-resistant property to the multilayer film. The second composition may comprise material that provides a puncture-resistant property to the multilayer film. Illustratively, the core layer in this embodiment includes only the first lane and the second lane and does not include a third lane.

In some other examples, a multilayer film includes a core layer comprising a plurality of tear-resistant lanes dispersed throughout the core layer. For example, a multilayer film may include tear-resistant lanes that are about 0.5 to about 1 inch dispersed periodically through the core layer.

The following numbered clauses include embodiments that are contemplated and non-limiting:

Clause 1. A multilayer film comprising
a cling layer.

Clause 2. The multilayer film of clause 1, any other suitable clause, or any combination of suitable clauses, further comprising a release layer spaced apart vertically from the cling layer along a vertical axis.

Clause 3. The multilayer film of clause 2, any other suitable clause, or any combination of suitable clauses, further comprising, a core layer located between the cling layer and the release layer.

Clause 4. The multilayer film of clause 3, any other suitable clause, or any combination of suitable clauses, wherein the core layer comprises a first lane made of a first composition.

Clause 5. The multilayer film of clause 4, any other suitable clause, or any combination of suitable clauses, wherein the core layer further comprises a second lane made of a second composition adjacent each side of the first lane along a longitudinal axis.

Clause 6. The multilayer film of clause 5, any other suitable clause, or any combination of suitable clauses, wherein the first composition is different than the second composition.

Clause 7. The multilayer film of clause 6, any other suitable clause, or any combination of suitable clauses, wherein the core layer has a thickness along the vertical axis that is perpendicular to the longitudinal axis, and each of the first lane and the second lane extend the thickness of the core layer along the vertical axis.

Clause 8. The multilayer film of clause 7, wherein the first composition comprises a material for providing puncture resistance to the multilayer film.

Clause 9. The multilayer film of clause 8, any other suitable clause, or any combination of suitable clauses, wherein the first composition comprises mLLDPE.

Clause 10. The multilayer film of clause 8, any other suitable clause, or any combination of suitable clauses, wherein second composition comprises a material for providing tear-resistance to the multilayer film.

Clause 11. The multilayer film of clause 10, any other suitable clause, or any combination of suitable clauses, wherein the second composition comprises polypropylene.

Clause 12. The multilayer film of clause 7, any other suitable clause, or any combination of suitable clauses, wherein the cling layer comprises a ULDPE material.

Clause 13. The multilayer film of clause 7, any other suitable clause, or any combination of suitable clauses, wherein the release layer comprises a mLLDPE material.

Clause 14. The multilayer film of clause 7, any other suitable clause, or any combination of suitable clauses, wherein the cling layer, the release layer, or both the cling layer and the release layer are not laminated to the core layer.

Clause 15. The multilayer film of clause 7, any other suitable clause, or any combination of suitable clauses, wherein no adhesive is present between the first lane and the second lane.

Clause 16. A multilayer film comprising
a first skin layer.

Clause 17. The multilayer film of clause 16, any other suitable clause, or any combination of suitable clauses, wherein the first skin layer comprises ULDPE.

Clause 18. The multilayer film of clause 17, any other suitable clause, or any combination of suitable clauses, further comprising a second skin layer.

Clause 19. The multilayer film of clause 18, any other suitable clause, or any combination of suitable clauses, wherein the second skin layer comprises mLLDPE.

Clause 20. The multilayer film of clause 19, any other suitable clause, or any combination of suitable clauses, wherein the second skin layer is spaced apart vertically from the first skin layer along a vertical axis.

Clause 21. The multilayer film of clause 20, any other suitable clause, or any combination of suitable clauses, further comprising a core layer located between the first skin layer and the second skin layer.

Clause 22. The multilayer film of clause 21, any other suitable clause, or any combination of suitable clauses, wherein the core layer includes a lane comprising mLLDPE and at least one lane comprising polypropylene located adjacent the mLLDPE lane along a longitudinal axis.

Clause 23. The multilayer film of clause 22, any other suitable clause, or any combination of suitable clauses, wherein the core layer has a thickness along the vertical axis that is perpendicular to the longitudinal axis, and each lane comprising polypropylene and the lane comprising mLLDPE extend the thickness of the core layer along the vertical axis.

Clause 24. The multilayer film of clause 23, any other suitable clause, or any combination of suitable clauses, wherein the lane comprising polypropylene and the lane comprising mLLDPE meet at an interface.

Clause 25. The multilayer film of clause 24, any other suitable clause, or any combination of suitable clauses, wherein the lane comprising mLLDPE and the lane comprising polypropylene meet at an interface that comprises a blend of a material from the lane comprising mLLDPE and the lane comprising polypropylene.

Clause 26. The multilayer film of clause 25, any other suitable clause, or any combination of suitable clauses, wherein the lane comprising mLLDPE and the lane comprising polypropylene blend together at the interface.

Clause 27. A method for coextruding a multilayer film, the method comprising
extruding a first skin layer.

Clause 28. The method of clause 27, any other suitable clause, or any combination of suitable clauses, further comprising extruding a second skin layer.

Clause 29. The method of clause 28, any other suitable clause, or any combination of suitable clauses, further comprising extruding a core layer located between the first skin layer and the second layer along a vertical axis.

Clause 30. The method of clause 29, any other suitable clause, or any combination of suitable clauses, wherein the step of extruding the core layer includes extruding together a puncture-resistant lane and tear-resistant lanes located on each side of the puncture-resistant lane along a longitudinal axis and each of the puncture-resistant lane.

Clause 31. The method of clause 30, any other suitable clause, or any combination of suitable clauses, wherein the tear-resistant lanes has a thickness along a vertical axis that is perpendicular to the longitudinal axis, and each of the puncture-resistant lane and the tear-resistant lanes extend the thickness of the core layer along the vertical axis so that each of the puncture-resistant lane and the tear-resistant lanes form an extrusion interface with each of the first skin layer and the second skin layer.

The invention claimed is:

1. A multilayer stretch film for wrapping a product, the multilayer stretch film comprising:
 a cling layer adapted to adhere to an outer surface of a product in response to the multilayer stretch film being wrapped around the product,
 a release layer adapted to release from a neighboring layer of the multilayer stretch film, the release layer spaced apart vertically from the cling layer along a vertical axis, and
 a core layer located between the cling layer and the release layer, the core layer comprising a first lane made of a first composition and a second lane made of a second composition adjacent each side of the first lane along a longitudinal axis perpendicular to the vertical axis, and the first composition is different than the second composition,
 wherein the core layer has a thickness along the vertical axis and each of the first lane and the second lane extend the thickness of the core layer along the vertical axis,
 wherein a first extrusion interface is formed between the release layer and the core layer and a second extrusion interface is formed between the core layer and the cling layer.

2. The multilayer stretch film of claim 1, wherein no adhesive is present at the first extrusion interface and the second extrusion interface.

3. The multilayer stretch film of claim 2, wherein the release layer is made of a third composition, and wherein the third composition of the release layer, the first composition of the first lane, and the second composition of the second lane blend at the first extrusion interface.

4. The multilayer stretch film of claim 1, wherein the second lane extends along the longitudinal axis from an outer edge of the multilayer stretch film to the first lane.

5. The multilayer stretch film of claim 1, wherein the cling layer and the release layer are not laminated to the core layer.

6. The multilayer stretch film of claim 1, wherein no adhesive is present between the first lane and the second lane.

7. The multilayer stretch film of claim 1, wherein the first composition comprises mLLDPE.

8. A multilayer stretch film for wrapping a product, the multilayer stretch film comprising:
 a cling layer,
 a release layer spaced apart vertically from the cling layer along a vertical axis,
 a core layer comprising a first lane made of a first composition and a second lane made of a second composition adjacent each side of the first lane along a longitudinal axis perpendicular to the vertical axis, and the first composition is different than the second composition,
 a first bulk layer located between the cling layer and the core layer along the vertical axis, and
 a second bulk layer located between the release layer and the core layer along the vertical axis,
 wherein the core layer has a thickness along the vertical axis and each of the first lane and the second lane extend the thickness of the core layer along the vertical axis.

9. The multilayer stretch film of claim 8, wherein the first bulk layer and the second bulk layer comprise polyolefin.

10. The multilayer stretch film of claim 8, wherein the first lane and the second lane meet at an interface that comprises a blend of the first composition and the second composition.

11. The multilayer stretch film of claim 8, wherein the cling layer comprises a ULDPE material.

12. The multilayer stretch film of claim 8, wherein the release layer comprises a mLLDPE material.

13. The multilayer stretch film of claim 8, wherein the second composition comprises polypropylene.

14. A multilayer stretch film comprising:
 a first skin layer,
 a second skin layer spaced apart vertically from the first skin layer along a vertical axis, and
 a core layer located between the first skin layer and the second skin layer, the core layer comprising a first lane made of a first composition and a second lane made of a second composition adjacent each side of the first lane along a longitudinal axis perpendicular to the vertical axis, and the first composition is different than the second composition,
 wherein the core layer has a thickness along the vertical axis and each of the first lane and the second lane extend the thickness of the core layer along the vertical axis, wherein a first extrusion interface is formed between the second skin layer and the core layer and a second extrusion interface is formed between the core layer and the first skin layer.

15. The multilayer stretch film of claim 14, wherein no adhesive is present at the first extrusion interface and the second extrusion interface.

16. The multilayer stretch film of claim 14, wherein the second skin layer is made of a third composition, and wherein the third composition of the second skin layer, the first composition of the first lane, and the second composition of the second lane blend at the first extrusion interface.

17. The multilayer stretch film of claim 14, wherein the second lane extends along the longitudinal axis from an outer edge of the multilayer stretch film to the first lane.

18. The multilayer stretch film of claim 14, wherein the first skin layer and the second skin layer are not laminated to the core layer.

19. The multilayer stretch film of claim 14, wherein no adhesive is present between the first lane and the second lane.

20. The multilayer stretch film of claim 14, wherein the first composition comprises mLLDPE.

* * * * *